United States Patent Office 3,813,418
Patented May 28, 1974

3,813,418
PROCESS FOR THE PREPARATION OF
6-KETO-$\Delta^{1,3,5(10)}$ STEROIDS
Helmut Hofmeister, Henry Laurent, Klaus Prezewowsky, and Rudolf Wiechert, Berlin, Germany, assignors to Schering Aktiengesellschaft, Berlin and Bergkamen, Germany
No Drawing. Filed July 12, 1972, Ser. No. 271,076
Int. Cl. C07c 169/20, 169/32
U.S. Cl. 260—397.4    11 Claims

ABSTRACT OF THE DISCLOSURE

A-ring aromatic steroids having estrogenic activity of the general formula

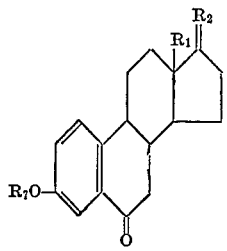

wherein $R_1$ is alkyl of 1-3 carbon atoms; $R_2$ is =O,

in which $R_3$ is hydrogen or acyl of up to 6 carbon atoms and $R_4$ is hydrogen or saturated or unsaturated alkyl of up to 4 carbon atoms, or

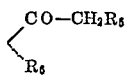

in which $R_5$ and $R_6$ are hydrogen, hydroxy or acyloxy, and $R_7$ is hydrogen, alkyl of up to 4 carbon atoms or acyl, are prepared by reacting a 3-keto-$\Delta^4$-steroid of the general formula

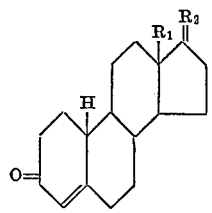

wherein $R_1$ and $R_2$ have the values given above, with a basic reagent in a high-boiling polar solvent in the presence of oxygen at temperatures of 70-150° C.; and optionally thereafter esterifying or etherifying any free hydroxy groups present in the product in a conventional manner.

BACKGROUND OF THE INVENTION

This invention relates to a process for the production of A-ring aromatic-6-keto steroids and to novel steroids thus produced.

Methods for the aromatization of the A-ring of steroids are known from the literature. Thus, for example, a 3-keto-$\Delta^{5(10)}$-19-nor-androstene can be epoxidized with a peracid to the corresponding 5,10-epoxy steroid, which is then converted with alkalis to 10β-hydroxy-$\Delta^4$-3-keto-19-nor-androstane and, with acids, to 3-hydroxy-1,3,5(10)-estratriene. See J. Org. Chem., 23 (1958), 1744. The aromatization can also be effected in one step with strong acids if the starting compounds are β,γ-disubstituted 3-keto-19-nor steroids. See German Published Application DAS 1,223,379.

Methods for the introduction of a 6-keto group in the estrane series have also been known for a long time. For this purpose, 3,17β-diacetoxy-1,3,5(10)-estratriene is oxidized under gentle conditions with chromic acid. See J. Biol. Chem., 133 (1940), 219.

It has now been found that the aromatization of the A-ring, with simultaneous oxidation in the 6-position, of 3-keto-$\Delta^4$-steroids can be conducted in a surprisingly simple manner.

SUMMARY OF THE INVENTION

According to this invention, A-ring aromatic steroids having estrogenic activity of the general Formula I

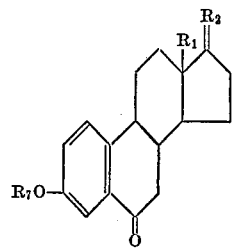

I wherein $R_1$ is alkyl of 1-3 carbon atoms; $R_2$ is =O,

in which $R_3$ is hydrogen or acyl of up to 6 carbon atoms and $R_4$ is hydrogen or saturated or unsaturated alkyl of up to 4 carbon atoms, or

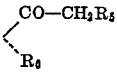

in which $R_5$ and $R_6$ are hydrogen, hydroxy or acyloxy, and $R_7$ is hydrogen, alkyl of up to 4 carbon atoms or acyl, are prepared by reacting a 3-keto-$\Delta^4$-steroid of the general Formula II

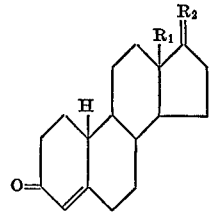

II wherein $R_1$ and $R_2$ have the values given above, with a basic reagent in a high-boiling polar solvent in the presence of oxygen at temperatures of 70-150° C.; and optionally thereafter esterifying or etherifying any free hydroxy groups present in the product in a conventional manner.

DETAILED DISCUSSION

Preferred compounds of Formulae I and II are those wherein
(a) $R_2$ is as defined therein except that when $R_3$ is acyl or $R_5$ or $R_6$ is acyloxy, the acyl group is that of an alkanolic acid of 1-6 carbon atoms, preferably acetic acid, and $R_4$ is hydrogen, methyl or ethinyl;
(b) $R_1$ is methyl or ethyl, especially those of (a); and
(c) $R_7$ is hydrogen, methyl or alkanoyl of 1-6 carbon atoms, preferably acetyl, especially those of (a) and (b).

The compounds of this invention of greatest importance are those wherein any ester group present thereon is an alkanoic acid of up to 6 carbon atoms. However, it will be apparent to those skilled in the art that ester groups of other acids can be present on the molecule in place thereof.

Acyl $R_3$ and $R_7$ groups and the acyl groups of the acyloxy groups of $R_5$ and $R_6$ can be the acyl group of any acid customarily employed in steroid chemistry for esterification purposes. Preferred acids are carboxylic and sulfonic acids of 1 to 15 carbon atoms, particularly lower, e.g., of 1–4 carbon atoms, and intermediate, e.g., of 4–8 carbon atoms, aliphatic carboxylic acids, preferably alkanoic acids. These acids can also be unsaturated, e.g., with 1–2 vinyl or an ethynyl double bond, branched, polybasic, e.g., di- or tri-basic, or substituted in the usual manner, for example by hydroxy, oxo, or amino groups or halogen atoms. Also suitable are cycloaliphatic, e.g., containing 3–8 ring carbon atoms, aromatic, e.g., containing 1–3 separate or fused carbocyclic rings, mixed aromatic-aliphatic and heterocyclic acids, e.g., containing 1 or 2 O, N and/or S atoms as ring members of a 5–6 membered ring, which can be fused to a benzene ring, which can likewise be substituted in a suitable manner. Such acids are, for example, formic acid, acetic acid, propionic acid, butyric acid, valeric acid, caproic acid, enanthic acid, undecylic acid, trimethylacetic acid, diethylacetic acid, tert.-butylacetic acid, phenylacetic acid, cyclopentylpropionic acid, oleic acid, lactic acid, mono-, di-, and trichloroacetic acid, aminoacetic acid, diethylamino-, piperidino-, and morpholinoacetic acids, succinic acid, adipic acid, benzoic acd, and nicotinic acid.

In addition to the compounds named hereinafter, others of this invention within the scope of Formula I include:

3-methoxy-17β-hydroxy-17α-ethinyl-1,3,5(10)-estratrien-6-one;
3,17β-dihydroxy-17α-ethenyl-1,3,5(10)-estratrien-6-one;
3,17β-dihydroxy-17α-methyl-1,3,5(10)-estratrien-6-one;
3,17,21-triacetoxy-19-nor-1,3,5(10)-pregnatriene-6,20-dione;
3,21-diacetoxy-17-hydroxy-19-nor-1,3,5(10)-pregnatriene-6,20-dione;
3,21-diacetoxy-19-nor-1,3,5(10)-pregnatriene-6,20-dione;
3,21-dihydroxy-19-nor-1,3,5(10)-pregnatriene-6,20-dione;
3,17,21-trihydroxy-19-nor-1,3,5(10)-pregnatriene-6,20-dione; and
3-acetoxy-19-nor-1,3,5(10)-pregnatriene-6,20-dione.

Examples for high-boiling, e.g., up to 200°, preferably up to 150° C., polar solvents are dimethylformamide, sulfolane, dimethyl sulfoxide, N-methylpyrrolidine and others. The solvents employed herein are water-miscible and contain one or more heteroatoms.

Suitable basic reagents are the alkaline, preferably alkali-metal, salts of weak acids, such as acetic acid and carbonic acid, e.g., potassium or sodium acetate and potassium or sodium carbonate, and of alcohols, such as, for example, potassium tri-tert.-butylate. Any anhydrous mildly or strongly basic compound substantially unaffected by the oxygen present in the reaction mixture can be employed.

The oxygen can be introduced in diluted form, e.g., atmospheric oxygen, or as pure oxygen into the reaction mixture. Generally, a large molar excess of oxygen is employed, viz., that amount required to bring the reaction to completion.

The temperature range of the reaction of this invention is from about 70° to 150° C. Higher temperatures are unsuitable, since they result in side reactions and resultant loss of yield. Lower temperatures are possible, in principle, but inordinately long reaction times must be expected. The reaction is conducted under substantially anhydrous conditions.

The optional subsequent esterification or etherification of any free hydroxy groups can be conducted according to conventional methods well known to persons skilled in the art. For example, the esterification can be effected with an acid halogenide or acid anhydride in the presence of a strong acid, e.g., hydrochloric acid, sulfuric acid and p-toluenesulfonic acid, or in the presence of a basic catalyst, e.g., pyridine and potassium bicarbonate. An example of the etherification is the reaction with diazomethane in tetrahydrofuran, alkyl sulfate in an alkaline solution and alkyl iodide with a silver salt or alone with the corresponding alcoholate.

The steroids of the general Formula II used as the starting material can be substituted in the usual manner, other than at the 6-position with other substituents so long as the substituent is one which one skilled in the art would not expect to exert an adverse effect on the process of this invention. Thus, the steroid structure can contain, for example, alkyl groups, preferably methyl, in the 15- or 16-position, or an oxygen function, e.g., a keto group at the 11-position, or a hydroxy group, e.g., at the 11- and/or 16-positions.

The compounds producible according to the process of this invention possess valuable pharmacological activity. They can also serve as intermediates for the preparation of other compounds having such activity. They generally exhibit the same type of pharmacological properties as the corresponding 6-desoxy steroids, but in most cases with a considerably greater effectiveness.

In particular, 3,17-β-dihydroxy-17α-ethinyl-1,3,5(10)-estratriene-6-one, in the subcutaneous Allen-Doisy test, exhibits the same estrogenic effectiveness as ethinyl estradiol but has an ovulation-inhibiting effect which is reduced tenfold.

The compounds of this invention can be employed in human and veterinary medicine in those cases where estrogenic effectiveness alone is desired. The compounds of this invention, particularly 3,17β - dihydroxy - 17α-ethinyl-1,3,5(10)-estratriene-6-one, are thus advantageously suitable for the treatment of disease and/or abnormal conditions wherein estrogens are commonly employed, optionally in combination with gestagens, such as, for example in the treatment of the climacteric and its ensuing diseases.

The compounds of this invention can be administered orally or parenterally. For therapeutic usage, they are processed into the conventional forms of drugs together with the corresponding additives, carriers, and flavor-ameliorating agents customary in galenic pharmacy. For oral application, particularly suitable are tables, drageés, capsules, pills, suspensions or solutions. For parenteral application, oily solutions are especially advantageous, such as, for example, sesame oil solutions or castor oil solutions, which can optionally contain additionally a diluent, e.g., benzyl benzoate or benzyl alcohol.

The amount of the compounds of this invention in the form of medicine which should be administered per dose is partially dependent on the mode of application. Thus, a single oral dose, e.g., a tablet, usually is about 10–200γ, preferably about 20γ, and a parenteral dose usually is about 25–400γ, e.g., in one ml. of an oily solution for intramuscular injection, preferably about 50 γ/ml.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

2 g. of 17β-hydroxy-17α-ethinyl-4-estren-3-one in 30 ml. of dimethylformamide is agitated with 2 g. of anhydrous potassium acetatae for 6 hours at 100° C. under a stream of atmospheric oxygen. The reaction product is then stirred into ice water. The precipitate is vacuum-filtered, washed with water, and taken up in methylene chloride. The solution is dried over sodium sulfate. After chromatography on silica gel and recrystallization from acetone-hexane, 450 mg. of 3,17β-dihydroxy-17α-ethinyl-1,3,5(10)-estratrien-6-one is obtained, M.P. 224–226° C, UV: $\epsilon_{222}=20,700$, $\epsilon_{256}=8,760$, $\epsilon_{326}=3,030$ (methanol).
$[\alpha]_D^{22}=-40°$ (c.=0.5, chloroform).

EXAMPLE 2

2 g. of 17β-acetoxy-17α-ethinyl-4-estren-3-one is agitated, under the introduction of atmospheric oxygen, with 2 g. of anhydrous sodium acetate for 6 hours at 100° C. in 20 ml. of dimethylformamide. After precipitation in ice water and working up the reaction mixture analogously to Example 1, the product is chromatographed on silica gel with 13.5–16.5% acetone/hexane, thus obtaining 1.1 g. of 3-hydroxy-17β-acetoxy-17α-ethinyl-1,3,5(10)-estratrien-6-one, M.P. 192–193° C.

UV: $\epsilon_{223}=19,700$, $\epsilon_{256}=8,340$, $\epsilon_{327}=2,860$ (methanol).
$[\alpha]_D^{22}=-40°$ (c.=0.5, chloroform).

EXAMPLE 3

2 g. of 17β-acetoxy-4-estren-3-one is agitated in 15 ml. of dimethyl sulfoxide with 1 g. of anhydrous potassium acetate with gradual introduction of pure oxygen for 4 hours at 120° C. After precipitating the reaction mixture in ice water and working it up analogously to Example 1, the product is chromatographed on silica gel with 11.7–17% acetone/hexane, thus obtaining 466 mg. of 3-hydroxy-17β-acetoxy-1,3,5(10)-estratrien-6-one, M.P. 276–278° C. (decomposition).

UV: $\epsilon_{221}=19,500$, $\epsilon_{254}=8,500$, $\epsilon_{325}=2,960$ (methanol).
$[\alpha]_D^{22}=-15.5°$ (c.=0.5, chloroform).

EXAMPLE 4

2 g. of 17-acetoxy-19-nor-4-pregnene-3,20-dione is agitated in 40 ml. of dimethylformamide with 1 g. of anhydrous potassium acetate for 24 hours at 120° C. with the introduction of atmospheric oxygen. After precipitation in ice water and working up the reaction mixture according to Example 1, the crude product is acetylated in 8 ml. of pyridine with 4 ml. of acetic anhydride at room temperature. The reaction solution is stirred into ice water. The precipitate is vacuum-filtered, washed several times with water, and taken up in methylene chloride. After chromatography on silica gel with 15.5–17.5% acetone/hexane, 446 mg. of 3,17-diacetoxy-19-nor-1,3,5(10)-pregnatriene-6,20-dione, M.P. 263–265° C., is isolated.

UV: $\epsilon_{207}=27,300$, $\epsilon_{247}=10,400$, $\epsilon_{297}=2,270$ (methanol).
$[\alpha]_D^{22}=-31°$ (c.=0.5, chloroform).

EXAMPLE 5

3 g. of 17β-hydroxy-18-methyl-17α-ethinyl-4-estren-3-one is agitated in 60 ml. of dimethylformamide with 1.5 g. of anhydrous potassium acetate under the introduction of oxygen for 8 hours at 120° C. After precipitation in ice water and working up the reaction mixture analogously to Example 1, the product is chromatographed on silica gel with 20–25% acetone/hexane, thus producing 1.5 g. of 3,17β-dihydroxy-18-methyl-17α-ethinyl-1,3,5-(10)-estratrien-6-one as a foam.

UV: $\epsilon_{221}=18,200$, $\epsilon_{254}=7,770$, $\epsilon_{324}=2,640$ (methanol).
$[\alpha]_D^{22}=-66°$ (c.=0.5, chloroform).

EXAMPLE 6

1.4 g. of 3,17β-dihydroxy-18-methyl-17α-ethinyl-1,3,5-(10)-estratrien-6-one is acetylated in 6 ml. of pyridine with 3 ml. of acetic anhydride within 1 hour at room temperature. The reaction solution is then stirred into ice water. The precipitate is vacuum-filtered, washed with water, taken up in methylene chloride, and dried over sodium sulfate. After recrystallization of the crude product from acetone/hexane, 1.3 g. of 17β - hydroxy - 3-acetoxy-18-methyl-17α-ethinyl-1,3,5(10) - estratrien - 6-one is obtained, M.P. 216–218° C.

UV: $\epsilon_{208}=26,100$, $\epsilon_{247}=10,600$, $\epsilon_{298}=2,190$ (methanol).
$[\alpha]_D^{22}=-77°$ (c.=0.5, chloroform).

EXAMPLE 7

Preparation of a drug (a) Tablet.—33.98 mg. of lactose, 15 mg. of corn starch, 3 mg. of polyvinylpyrrolidone, and 3 mg. of a lubricant mixture are micronized and compressed together with 20γ of 3,17β-dihydroxy - 17α - ethinyl - 1,3,5(10)-estratrien-6-one.

(b) Oily solution.—10 mg. of 3,17β-dihydroxy-17α-ethinyl-1,3,5(10)-estratrien-6-one is dissolved in castor oil. The solution is replenished to a volume of 200 ml. and, after sterilization, filled into 1 ml.-ampoules.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of compounds of the formula

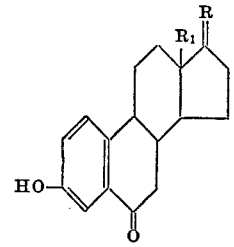

wherein $R_1$ is alkyl of 1–3 carbon atoms; and $R_2$ is selected from the group consisting of =O,

in which $R_3$ is hydrogen or acyl of up to 6 carbon atoms and $R_4$ is hydrogen or saturated or monounsaturated alkyl of up to 4 carbon atoms, and

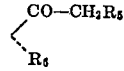

in which $R_5$ and $R_6$ are hydrogen, hydroxy or acyloxy, which comprises reacting a 3-keto-Δ⁴ steroid of the formula

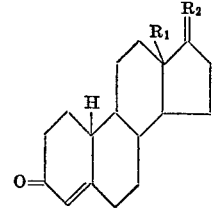

wherein $R_1$ and $R_2$ have the values given above, with a basic reagent in a high-boiling polar solvent, in the presence of oxygen at a temperature of about 70–150° C.

2. A process according to claim 1 wherein the polar solvent is dimethylformamide or dimethylsulfoxide.

3. A process according to claim 1 wherein the basic reagent is an alkali-metal salt of a weak acid.

4. A process according to claim 1 wherein $R_2$ is as defined therein except that when $R_3$ is acyl or $R_5$ or $R_6$ is acyloxy, the acyl group is that of an alkanoic acid of 1–6 carbon atoms, $R_4$ is hydrogen, methyl or ethinyl, and $R_1$ is methyl or ethyl.

5. A process according to claim 4 wherein the polar solvent is dimethylformamide or dimethylsulfoxide and wherein the basic reagent is an alkali-metal salt of a weak acid.

6. A compound of the formula

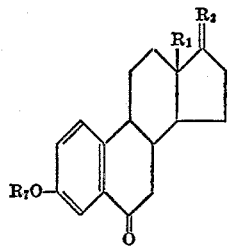

wherein $R_1$ is lower alkyl or 1–3 carbon atoms; $R_2$ is

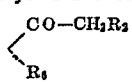

in which $R_5$ and $R_6$ are hydrogen, hydroxy or alkanoyloxy of up to 6 carbon atoms; and $R_7$ is hydrogen, alkyl of up to 4 carbon atoms or alkanoyl of up to 6 carbon atoms.

7. A compound of claim 6, 3,17β-diacetoxy-19-nor-1,3,5(10)-pregnatriene-6,20-dione.

8. 3,17β-dihydroxy-18-methyl-17α-ethinyl-1,3,5(10)-estratrien-6-one.

9. 17β - hydroxy - 3 -acetoxy - 18 - methyl - 17α - ethinyl-1,3,5(10)-estratrien-6-one.

10. A process according to claim 3 wherein the basic reagent is potassium or sodium acetate.

11. A process according to claim 5 wherein the basic reagent is potassium or sodium acetate.

References Cited

UNITED STATES PATENTS

| 3,264,333 | 8/1966 | High | 260—397.45 |
| 3,519,714 | 7/1970 | Hughes et al. | 260—397.4 |

OTHER REFERENCES

"Steroids," by Fieser et al. (1959), p. 591 relied on.

ELBERT L. ROBERTS, Primary Examiner

U.S. Cl. X.R.

424—243

UNITED STATES PATENT OFFICE
CERTIFICATE OF CORRECTION

Patent No. 3,813,418   Dated May 28, 1974

Inventor(s) Helmut Hofmeister, et al.

It is certified that error appears in the above-identified patent and that said Letters Patent are hereby corrected as shown below:

IN THE CLAIMS:

CLAIM 6, COLUMN 7, FIRST LINE AFTER THE FIRST FORMULA:

"or" should read -- of --;

SECOND LINE AFTER THE FIRST FORMULA:

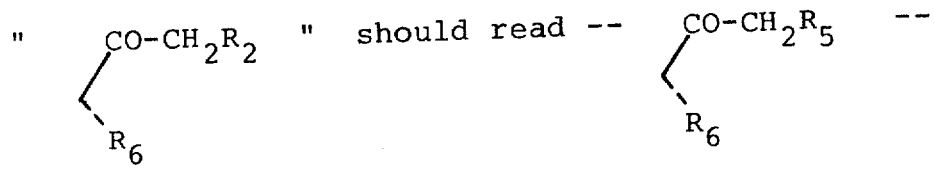

Signed and sealed this 17th day of September 1974.

(SEAL)
Attest:

McCOY M. GIBSON JR.
Attesting Officer

C. MARSHALL DANN
Commissioner of Patents